(12) United States Patent
Tsai et al.

(10) Patent No.: US 11,445,173 B2
(45) Date of Patent: Sep. 13, 2022

(54) METHOD AND APPARATUS FOR INTRA PREDICTION FUSION IN IMAGE AND VIDEO CODING

(71) Applicant: MediaTek Singapore Pte. Ltd., Singapore (SG)

(72) Inventors: Chia-Ming Tsai, Hsinchu (TW); Han Huang, San Jose, CA (US); Chih-Wei Hsu, Hsinchu (TW); Yu-Wen Huang, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/763,045

(22) PCT Filed: Oct. 26, 2018

(86) PCT No.: PCT/CN2018/112148
§ 371 (c)(1),
(2) Date: May 11, 2020

(87) PCT Pub. No.: WO2019/091292
PCT Pub. Date: May 16, 2019

(65) Prior Publication Data
US 2020/0396444 A1 Dec. 17, 2020

Related U.S. Application Data

(60) Provisional application No. 62/590,408, filed on Nov. 24, 2017, provisional application No. 62/585,001, filed on Nov. 13, 2017.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/70* (2014.11)

(58) Field of Classification Search
CPC .. H04N 19/105; H04N 19/176; H04N 19/159; H04N 19/70; H04N 19/132
See application file for complete search history.

(56) References Cited

U.S. PATENT DOCUMENTS 9,083,974 B2   7/2015   Jeon et al.
9,955,171 B2   4/2018   Tsukuba et al.
(Continued)

FOREIGN PATENT DOCUMENTS

CN   102972028 A   3/2013
CN   103281542 A   9/2013
(Continued)

OTHER PUBLICATIONS

Panusopone et al. Unequal Weight Planar Prediction and Constrained PDPC, Joint Video Exploration Team (JVET) of ITU-T SG 16 WP 3 and ISO/IEC JTC 1/SC 29/WG 11 5th Meeting: Geneva, CH, Jan. 12-20, 2017 (Year: 2017).*
(Continued)

*Primary Examiner* — Richard A Hansell, Jr.
(74) *Attorney, Agent, or Firm* — McClure, Qualey & Rodack, LLP (57) ABSTRACT

A method and apparatus for video coding using Intra prediction are disclosed. In one method, a first prediction sample in an immediately right column of the current block and a second prediction sample in an immediately below row of the current block are derived using angular prediction. The first prediction sample and a left column reference sample in the same row as the first prediction sample are interpolated to generate a horizontal predictor. The second
(Continued)

prediction sample and an above-row reference sample in the same column as the second prediction sample are interpolated to generate a vertical predictor. The vertical predictor and the horizontal predictor are linearly combined to generate an angular-planar prediction sample. In another method, a first predictor is generated using angular prediction and a second predictor is generated using planar prediction. The first predictor and the second predictor are linearly combined to generate a fused Intra predictor.

10 Claims, 6 Drawing Sheets

(51) Int. Cl.
    *H04N 19/159*     (2014.01)
    *H04N 19/176*     (2014.01)
    *H04N 19/70*     (2014.01)

(56) References Cited

U.S. PATENT DOCUMENTS

| | | | |
|---|---|---|---|
| 10,728,542 B2* | 7/2020 | Xu | H04N 19/513 |
| 2013/0051467 A1* | 2/2013 | Zhou | H04N 19/105 |
| | | | 375/E7.243 |
| 2014/0003518 A1* | 1/2014 | Bang | H04N 19/176 |
| | | | 375/240.12 |
| 2014/0056352 A1* | 2/2014 | Park | H04N 19/593 |
| | | | 375/240.12 |
| 2014/0307788 A1* | 10/2014 | Lim | H04N 19/147 |
| | | | 375/240.12 |
| 2017/0150186 A1* | 5/2017 | Zhang | H04N 19/625 |
| 2017/0272745 A1 | 9/2017 | Liu et al. | |
| 2018/0184083 A1* | 6/2018 | Panusopone | H04N 19/186 |
| 2018/0199062 A1* | 7/2018 | Zhang | H04N 19/42 |
| 2018/0352222 A1* | 12/2018 | Liu | H04N 19/182 |
| 2019/0110045 A1* | 4/2019 | Zhao | H04N 19/176 |
| 2019/0281290 A1* | 9/2019 | Lee | H04N 19/463 |
| 2019/0313091 A1* | 10/2019 | Xu | H04N 19/119 |
| 2019/0394460 A1* | 12/2019 | Lee | H04N 19/96 |
| 2020/0413069 A1* | 12/2020 | Lim | H04N 19/11 |

FOREIGN PATENT DOCUMENTS

| | | | |
|---|---|---|---|
| EP | 2 391 129 A1 | 11/2011 | |
| WO | 2017/123133 A1 | 7/2017 | |
| WO | WO-2017190288 A1 * | 11/2017 | ........... H04N 19/105 |

OTHER PUBLICATIONS

International Search Report dated Dec. 29, 2018, issued in application No. PCT/CN2018/112148.
European Search Report dated Aug. 16, 2021, issued in application No. EP 18877232.1.
Extended European Search Report dated Mar. 15, 2022, issued EP 21210950.8.
Yan, Y., et al.; "Improved h.264 intra coding based on bi-directional intra prediction, directional transform, and adaptive coefficient scanning;" 15th IEEE International Conference On Image Processing: ICIP 2008; Oct. 2008; pp. 2116-2119.
Panusopone, K., et al; "Weighted Angular Prediction;" Joint Video Exploration Team (JVET) of ITU-T SG 16 WP 3 and ISO/IEC JTC 1/SC 29/WG 11; Apr. 2017; pp. 1-4.

* cited by examiner

METHOD AND APPARATUS FOR INTRA PREDICTION FUSION IN IMAGE AND VIDEO CODING

CROSS REFERENCE TO RELATED PATENT APPLICATION(S)

The present invention claims priority to U.S. Provisional Patent Application, Ser. No. 62/585,001, filed on Nov. 13, 2017 and U.S. Provisional Patent Application, Ser. No. 62/590,408, filed on Nov. 24, 2017. The U.S. Provisional Patent Applications are hereby incorporated by reference in their entireties.

TECHNICAL FIELD

The present invention relates to Intra prediction in image and video coding. In particular, the present invention discloses techniques to combine multiple Intra prediction modes to form a new Intra prediction mode to improve coding performance.

BACKGROUND

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

The HEVC coding comprises Inter prediction and Intra prediction. Intra prediction is a technique used for intra-picture prediction in image/video coding, wherein the spatially neighboring coded samples in the same picture are used to predict the samples in the current block that is being coded. In a typical video coder, such as High Efficiency Video Coding (HEVC), there are 3 types of Intra prediction: the angular Intra prediction, the DC prediction and the planar prediction. In the angular Intra prediction, the samples in current block are predicted directionally from spatially neighboring samples that are reconstructed before. Given the sample location in current block, the prediction direction is used to identify the location of reference sample in the reconstructed neighboring samples. The location can be non-integer indicating a sub-sample location. In this case, an interpolation process can be applied to obtain the reference sample value. The DC prediction mode uses an average value of reference samples for the prediction of all samples in current block. It assumes a flat surface in current block with a value matching the mean value of the boundary samples. The planar prediction assumes an amplitude surface with a horizontal and vertical slope derived from the boundaries, the average values of two linear predictions based on four corner reference samples are used to predict the samples in current block. In the following, the details of Intra prediction technique in HEVC are described.

Figure 1:
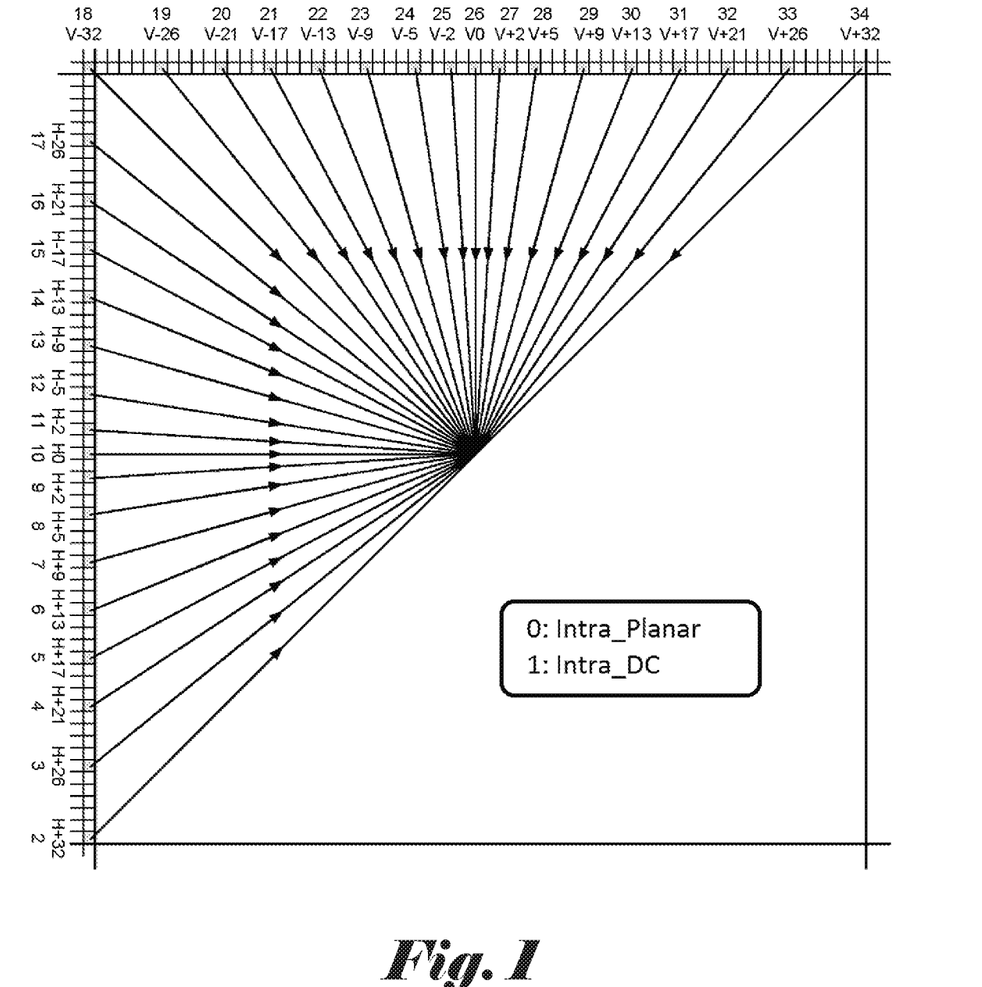
FIG. 1 illustrates the prediction directions associated with the angular modes for the Intra prediction modes specified in the High Efficiency Video Coding (HEVC) standard.
Figure 2:
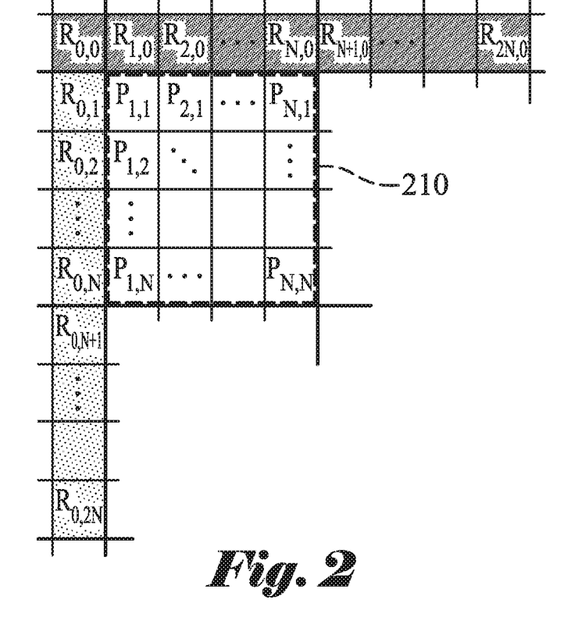
FIG. 2 illustrates the reference samples used for deriving Intra prediction samples, where the reference samples are a set of samples from above and to the left of current block.

In HEVC, a total of 35 Intra prediction modes are supported. Intra prediction mode 0 corresponds to the planar Intra prediction mode; mode 1 corresponds to DC prediction; and modes 2 to 34 correspond to angular prediction modes with different directionalities. FIG. 1 illustrates the prediction directions associated with the angular modes. The reference samples, as illustrated in FIG. 2, are a set of samples from above and to the left of current block (indicated by a dash-line box 210) to be predicted. The reference samples are denoted by $R_{x,y}$, where (x,y) corresponds to the coordinates having its origin one pixel above and to the left of the top-left corner of the current block. The predicted samples are denoted as $P_{x,y}$. When some reference samples are unavailable for Intra prediction, such as reference pixels at picture or slice boundaries, missing reference samples on the left boundary are generated by repetition from the closest available reference sample below (or from above if no samples below are available) and missing reference samples on the top boundary are generated by repetition from the closest available reference sample from the left. If no reference sample is available for Intra prediction, all the samples are assigned a nominal average sample value for a given bit depth (e.g. sample value 128 for 8-bit data). An international standard organization called JVET (joint video exploration team) has been established by both ITU-T VCEG and ISO/IEC MPEG to study the next generation video coding technologies. For the next generation video coding standard, a total of 67 Intra modes has been proposed including 65 angular Intra prediction.

Angular Intra Prediction

Figure 3:
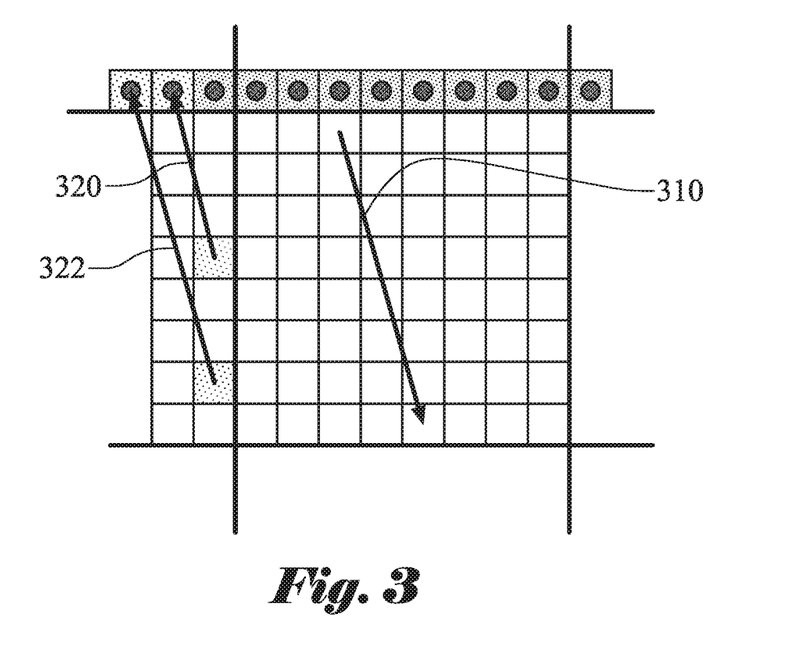
FIG. 3 illustrates an exemplary process for extending the top reference row with samples from the left reference column for an 8×8 block.

The angular Intra prediction process in HEVC is performed by extrapolating sample values from the reconstructed reference samples utilizing a given directionality. In order to simplify the process, all sample locations within one prediction block are projected to a single reference row/column depending on the directionality of the selected prediction mode, utilizing the left reference column for angular modes 2 to 17 and the above reference row for angular modes 18 to 34. In the cases that the projected pixel locations have negative indexes, the reference row or column is extended by projecting the left reference column to extend the top reference row toward left, or projecting the top reference row to extend the left reference column upward in the case of vertical and horizontal predictions, respectively. FIG. 3 depicts an exemplary process for extending the top reference row with samples from the left reference column for an 8×8 block. In FIG. 3, the left reference samples are projected to extend the top reference row. The arrow 310 represents the prediction direction and the arrows 320 and 322 represent the reference sample projections in the case of Intra mode 23.

Each angular Intra predicted sample $P_{x,y}$ in the case of mainly vertical prediction (i.e., modes 18 to 34) is obtained by projecting its location to a reference row of pixels applying the selected prediction direction and interpolating a value for the sample at 1/32 pixel accuracy. Interpolation is performed linearly utilizing the two closest reference samples:

$$P_{x,y}=((32-w_y)\cdot R_{i,0}+w_y\cdot R_{i+1,0}+16)>>5 \qquad (1)$$

In the above equation, $w_y$ is the weighting between the two reference samples corresponding to the projected sub-pixel location in between $R_{i,0}$ and $R_{i+1,0}$, and ">>" denotes a bit shift operation to the right. Reference index i and weighting parameter are calculated based on the projection direction (describing the tangent of the prediction direction in units of 1/32 samples and having a value from −32 to 32 as shown in FIG. 1) as:

$$c_y=(y\cdot d)>>5, \qquad (2)$$

$$w_y=(y\cdot d)\&31, \text{ and} \qquad (3)$$

$$i=x+c_y \qquad (4)$$

In the above equations, "&" denotes the bitwise AND operation and the "d" is the projection direction (i.e., Intra prediction angle).

In the case of mainly horizontal prediction (i.e., modes 2 to 17 for HEVC Intra prediction), the predicted samples can be derived in a similar manner as described above by swapping the x and y coordinates in equations (1) through (4).

DC Prediction and Planar Prediction

The DC predicted sample is obtained by averaging over all the reference samples:

$$P_{x,y}=(\Sigma_{x=0}^{N-1}R_{x,-1}+\Sigma_{y=0}^{N-1}R_{-1,y}+N)>>(\log_2 N+1). \qquad (5)$$

Figure 4:
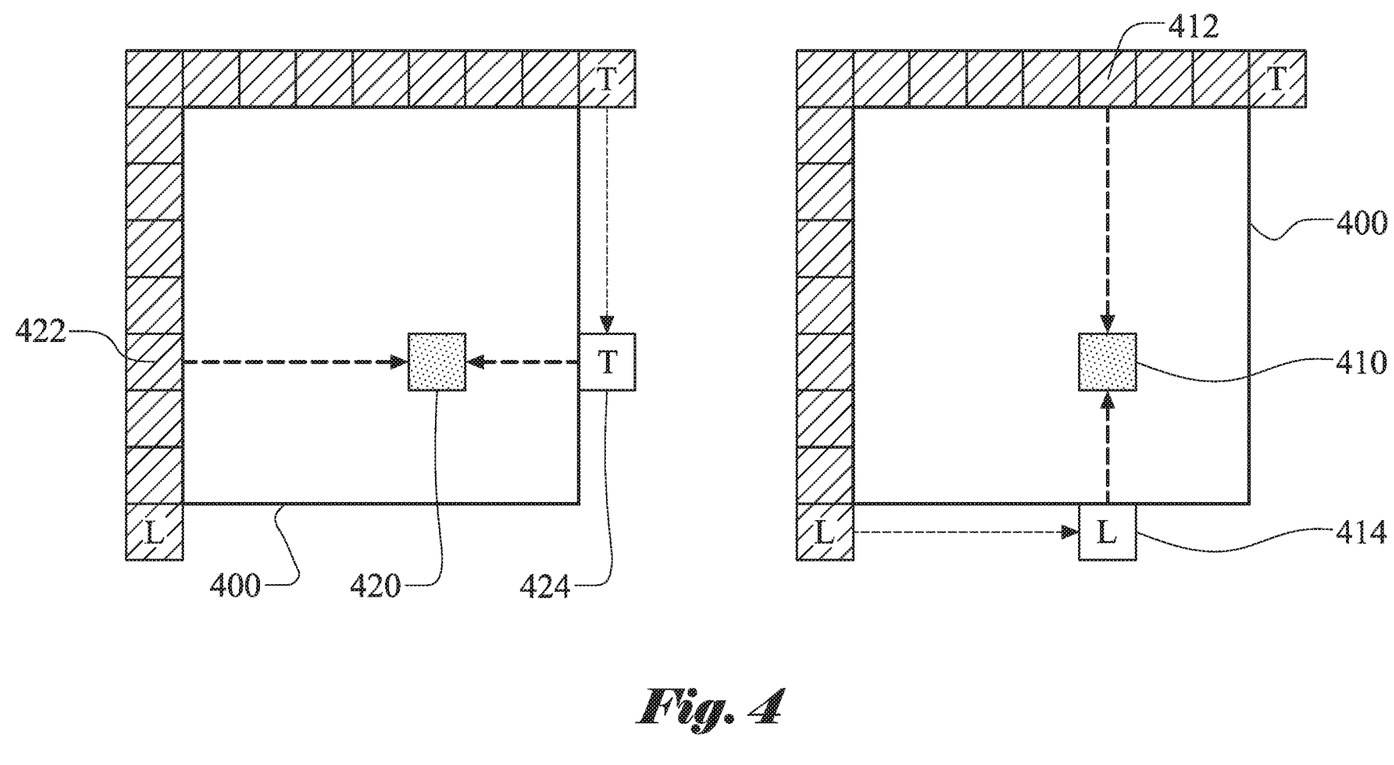
FIG. 4 illustrates an example of the planar prediction in the High Efficiency Video Coding (HEVC) standard, where a predictoris defined as the average of two linear predictions.

The planar prediction in HEVC is defined as the average of two linear predictions as shown in FIG. 4. In FIG. 4, block 400 corresponds to a current block with a size of N×N to be Intra predicted. The small squares above and to the left of the current block are reference samples.

For the first predictor $P_{x,y}^V$ (i.e., sample 410), it is obtained by copying the reference sample $R_{0,N+1}$ (i.e., sample L) to the row immediately below the block 400 and then applying linear interpolation in each column (i.e., interpolating sample 412 and sample 414).

For the second predictor $P_{x,y}^H$ (i.e., sample 420), it is obtained by copying the reference sample $R_{N+1,0}$ (i.e., sample T) to the column immediately right to the block 400 and then applying linear interpolation in each row (i.e., interpolating sample 422 and sample 424).

The final predicted sample is obtained by:

$$P_{x,y}^V=(N-y)\cdot R_{x,0}+y\cdot R_{0,N+1}, \qquad (6)$$

$$P_{x,y}^H=(N-x)\cdot R_{0,y}+x\cdot R_{N+1,0}, \text{ and} \qquad (7)$$

$$P_{x,y}=(P_{x,y}^V+P_{x,y}^H+N)>>(\log_2 N+1). \qquad (8)$$

Reference Sample Smoothing

HEVC utilizes a smoothing filter corresponding to ([1 2 1]/4) on the reference samples for the block of size 8×8 and larger. The filtering operation is applied for each reference sample using neighbouring reference samples. The first reference sample $R_{0,2N}$ and $R_{2N,0}$ are not filtered. For 32×32 blocks, each of the angular modes, except for horizontal and vertical modes, uses a filtered reference. In 16×16 blocks, the modes not using a filtered reference samples are extended to the four modes (i.e., modes 9, 11, 25 and 27) closest to horizontal and vertical. Smoothing is also applied where the planar mode is used, for block size 8×8 and larger. For 8×8 blocks, only the diagonal modes (i.e., modes 2, 18 and 34) use a filtered reference.

Boundary Smoothing

In HEVC, in the case of luma component, the first prediction row and column are filtered in DC prediction, horizontal angular prediction and vertical angular prediction modes. For DC prediction, a two-tap finite impulse response filter (corner sample with three-tap filter) is used. For horizontal and vertical prediction, a gradient-based smoothing method is used.

In the present invention, new Intra prediction modes are disclosed to improve the coding performance.

SUMMARY

A method and apparatus for encoding or decoding are disclosed. According to this method, input data associated with a current block in a current image are received. For at least one sample in the current block, a left reference sample and a right predictor in a same row as said at least one sample are identified; a first predictor is generated by interpolating the left reference sample and the right predictor; a top reference sample and a bottom predictor in a same column as said at least one sample are identified; a second predictor is generated by interpolating the top reference sample and the bottom predictor; and a final Intra prediction sample for said at least one sample in the current block is generated according to a weighted sum of the first predictor and the second predictor. Predictive encoding or decoding is then applied to the current block using an Intra prediction block comprising the final Intra prediction sample. The left reference sample corresponds to a previously coded sample in an immediately left column of the current block and the right predictor located in an immediately right column of the current block is generated according to angular prediction. The top reference sample corresponds to a previously coded sample in an immediately above row of the current block and the bottom predictor located in an immediately below row of the current block is generated according to the angular prediction.

For the method mentioned above, a top-right predictor located at an intersection of the immediately right column and the immediately above row of the current block can be generated from one or more first reference samples in an angular direction associated with the angular prediction; and a bottom-left predictor located at an intersection of the immediately left column and the immediately below row of the current block is generated from one or more second reference samples in the angular direction associated with the angular prediction; where the right predictor is the same the top-right predictor and the bottom predictor is the same the bottom-left predictor. In another embodiment, the right predictor can be generated from one or more first reference samples in an angular direction associated with the angular prediction and the bottom predictor is generated from one or more second reference samples in the angular direction associated with the angular prediction. In yet another embodiment, a bottom-right corner predictor located at an intersection of the immediately right column and the immediately below row of the current block can be generated from one or more reference samples in an angular direction associated with the angular prediction; the right predictor is generated by interpolating the bottom-right corner predictor and a top-right reference sample located at an intersection of the immediately right column and the immediately above row of the current block; and the bottom predictor is generated by interpolating the bottom-right corner predictor and a bottom-left reference sample located at an intersection of the immediately left column and the immediately below row of the current block.

For the above method, the weighted sum of the first predictor and the second predictor can be derived using different weighting factors for the first predictor and the second predictor. The weighted sum of the first predictor and the second predictor can also be derived using a same weighting factor corresponding to 0.5 for the first predictor and the second predictor. In this case, the final Intra prediction sample can be calculated by right-shifting a sum of the first predictor and the second predictor by 1 bit.

For the above method, when the current block corresponds to a non-square block, interpolation process of the first predictor uses a first parameter depending on width of the current block; interpolation process of the second predictor uses a second parameter depending on height of the current block; and the final Intra prediction sample is generated using third parameters depending on both height and width of the current block for division-less implementation of the final Intra prediction sample.

For the above method, a syntax element can be signaled to indicate whether the Intra prediction block comprises the final Intra prediction sample at an encoder side. On the other hand, a syntax element indicating whether the Intra prediction block comprises the final Intra prediction sample can be parsed at a decoder side.

Another method and apparatus for encoding or decoding are disclosed. According to the second method, input data associated with a current block in a current image are received. A first prediction block is generated according to angular prediction. A second prediction block is generated according to planar prediction. A final Intra prediction block is generated using a weighted sum of the first prediction block and the second prediction block. Predictive encoding or decoding is applied to the current block using the final Intra prediction block.

For the second method, the angular prediction may generate one prediction sample using both a top reference sample located in an immediately above row of the current block and a left reference sample located in an immediately left column of the current block. The angular prediction may generate one prediction sample using either one or more filtered reference sample of the current block or one or more un-filtered reference sample of the current block. The angular prediction generates boundary prediction samples for boundary samples of the current block using one or more filtered reference sample of the current block and wherein the boundary prediction samples are either filtered or unfiltered before said applying predictive encoding or decoding to the current block using the final Intra prediction block. For boundary prediction samples generated by the angular prediction at boundary locations of the current block, the boundary prediction samples are either filtered or unfiltered before said applying predictive encoding or decoding to the current block using the final Intra prediction block.

For the second method, when the current block corresponds to a non-square block, horizontal interpolation process of the planar prediction uses a first parameter depending on width of the current block; vertical interpolation process of the planar prediction uses a second parameter depending on height of the current block; and the final Intra prediction block is generated using third parameters depending on both height and width of the current block for division-less implementation of the planar prediction.

For the second method, a syntax element can be signaled to indicate whether a regular Intra prediction block or the final Intra prediction block is used at an encoder side. On the other hand, a syntax element indicating whether a regular Intra prediction block or the final Intra prediction block is used can be parsed at a decoder side.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In this invention, methods for Intra prediction fusion are disclosed, wherein the final prediction signal is obtained by a weighted sum of two predictors derived from two different prediction methods. Let p be the final prediction value, $p_0$ be the prediction value obtained by the first prediction method and $p_1$ be the prediction value obtained by the second prediction method, then $p=w_0 \cdot p_0+w_1 \cdot p_1$, where $w_0+w_1=1$. For example, $w_0$ and $w_1$ are both equal to 0.5 and the calculation can also be implemented by $p=(p_0+p_1)>>1$, which implies a division-less operation since divide-by-2 operation is implemented as the right-shift operation (i.e., ">>").

In one embodiment, the first predictor is obtained by angular Intra prediction and the second predictor is a smooth predictor obtained by planar Intra prediction. The angular Intra prediction can be similar to those in HEVC. However, the angular prediction does not have to use the same angular directions as defined in HEVC. Any modifications to the angular Intra prediction process can also be used in the proposed method. For example, angular prediction with more granularities in prediction direction, such as the 65 angular directions as defined in the next-generation video coding, can be used. In another example, reference smoothing filter can be applied or not applied to the reference samples. In yet another example, boundary smoothing can be applied or not applied to the boundary samples in predicted block. Also, weighted angular prediction as disclosed by Panusoppone et al. in JVET-F0104 ("Weighted Angular Prediction", Joint Video Exploration Team (JVET) of ITU-T SG 16 WP 3 and ISO/IEC JTC 1/SC 29/WG 11, 6th Meeting: Hobart, AU, 3 Mar.-7 Apr. 2017, Document: JVET-F0104) can be used. In this disclosure, the angular prediction refers to any directional Intra prediction, such as the angular prediction as defined in HEVC, the next-generation video coding or other modified or altered forms of angular prediction.

Similarly, the planar Intra prediction can be the same as that used in HEVC. However, other modified/improved planar Intra prediction methods can be used as well. For example, instead of using reference samples $R_{0,N+1}$ and $R_{N+1,0}$ in equations (6)-(8), the $P_{x,N}$ and $P_{N,y}$ derived from angular prediction can be used. In another example, the bottom-right corner sample of the predicted block $P_{N+1,N+1}$ is first coded, then $P_{x,N+1}$ is obtained by interpolating between $R_{0,N+1}$ and $P_{N+1,N+1}$, where x=1, . . . , N. Also, $P_{N+1,y}$ can be obtained by interpolating between $R_{N+1,0}$ and $P_{N+1,N+1}$, where y=1, . . . , N. Finally, the predictor is obtain by:

$$P_{x,y}^v = (N-y) \cdot R_{x,0} + y \cdot P_{x,N+1}, \quad (9)$$

$$P_{x,y}^H = (N-x) \cdot R_{0,y} + x \cdot P_{N+1,y}, \text{ and} \quad (10)$$

$$P_{x,y} = (P_{x,y}^v + P_{x,y}^H + N) >> (\log_2 N + 1). \quad (11)$$

In still another example, the planar Intra prediction method can be an un-equal weighted planar prediction as disclosed by Panusoppone et al. in JVET-E0068 ("Unequal Weight Planar Prediction and Constrained PDPC", Joint Video Exploration Team (JVET) of ITU-T SG 16 WP 3 and ISO/IEC JTC 1/SC 29/WG 11, 5th Meeting: Geneva, CH, 12-20 Jan. 2017, Document: JVET-E0068). In this disclosure, the planar prediction refers to any smooth Intra prediction utilizing multiple reference samples at corners of the current block, such as the planar prediction as defined in HEVC, or other modified or altered forms of planar prediction.

In another embodiment of the present invention, a right most column and a bottom row of samples are first obtained by angular prediction. Then, with the reference samples and predicted right most column and bottom row samples available, the predicted samples $P_{x,y}$ can be derived as a weighted average of the coded neighbouring reference samples and predicted right most column and bottom row samples.

For example, the predicted samples $P_{x,y}$ of adaptive planar prediction can be calculated as the bellowing equations (12)-(14). Note that, the definitions of $P_{x,N+1}$ in (12) and $P_{N+1,y}$ in (13) are not the same as those in equations (9) and (10).

$$P_{x,y}^v = (N-y) R_{x,0} + y \cdot P_{x,N+1}, \quad (12)$$

$$P_{x,y}^H = (N-x) \cdot R_{0,y} + x \cdot P_{N+1,y}, \text{ and} \quad (13)$$

$$P_{x,y} = (P_{x,y}^v + P_{x,y}^H + N) >> (\log_2 N + 1). \quad (14)$$

Figure 5A:
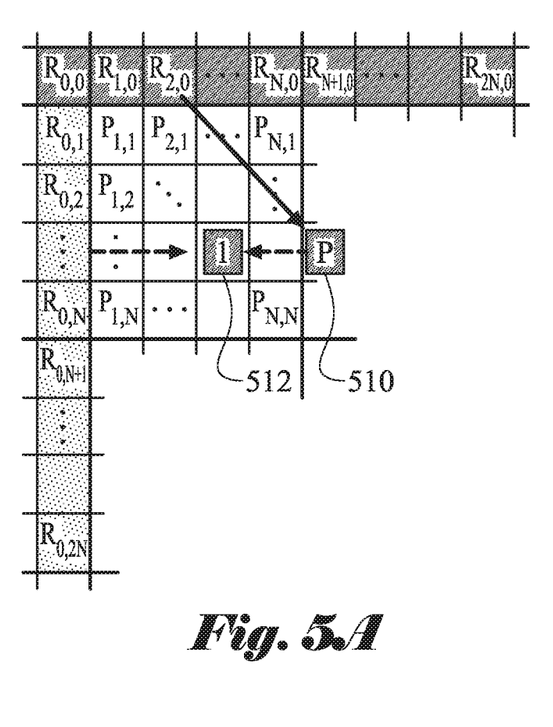
FIG. 5A illustrates an example of horizontal interpolation of the angular-planar prediction according to one embodiment of the present invention.
Figure 5B:
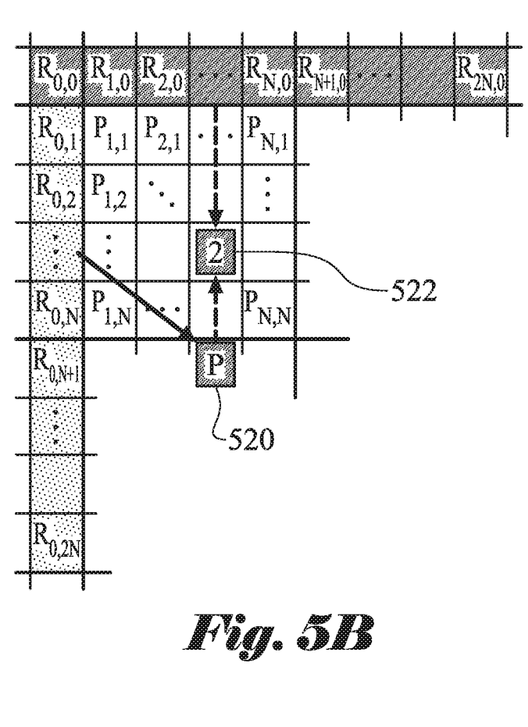
FIG. 5B illustrates an example of vertical interpolation of the angular-planar prediction according to one embodiment of the present invention.

As described in the above equations, the right most column refers to an immediately right column of the current block (i.e., sample $P_{N+1,y}$) and the bottom row refers to an immediately below row of the current block (i.e., sample $P_{x,N+1}$), in which N is the width and height of the current block. The method of adaptive planar prediction as described in the equations (9)-(14) is also referred as angular-planar prediction since prediction samples derived by angular prediction are used to generate a prediction sample in a manner similar to the planar prediction. The angular-planar prediction is also referred as adaptive planar prediction in this disclosure. In the above equations, $P_{x,N+1}$ and $P_{N+1,y}$ are obtained using an angular prediction mode in the same manner as or similar to the HEVC angular prediction. Alternatively, $P_{x,N+1}$ and $P_{N+1,y}$ can be obtained by some modified angular prediction methods, such as the weighted angular prediction as disclosed in JVET-F0104. An exemplary process of angular-planar prediction is shown in FIG. 5A and FIG. 5B.

A procedure of the angular-planar prediction is described as follows. For a given angular prediction direction as indicated by the solid arrows in FIG. 5A and FIG. 5B.

First step: $P_{N+1,y}$, y=1, . . . , N (i.e., prediction samples in the immediately right column of the current block) and $P_{x,N+1}$, x=1, . . . , N (i.e., prediction samples in the immediately below row of the current block) are derived by angular prediction, where one $P_{N+1,y}$ (510) is illustrated in FIG. 5A and one $P_{x,N+1}$ (520) is illustrated in FIG. 5B.

Second step: $P_{x,y}^H$ (512) and $P_{x,y}^v$ (522) are derived by vertical and horizontal interpolations, as shown in FIG. 5A and FIG. 5B respectively.

Third step: the final predictor $P_{x,y}$ is calculated by weighted averaging between $P_{x,y}^H$ and $P_{x,y}^v$, and normalization.

In the another embodiment, the final predicted samples $P_{x,y}$ of adaptive planar prediction is calculated using unequal weight assignment depending on the location as shown below:

$$P_{x,y} = (W \times (x+1) \times P_{x,y}^v + H \times (y+1) \times P_{x,y}^H) / (H \times W \times (x+y+2)) \quad (15)$$

In the above equation, W and H are the width and height of the predicted block. Similar to JVET-E0068, some look-up-table and shift operations can be applied to replace the division in equation (15).

In above descriptions (e.g., the examples associated with equations (9) to (14)), the block is assumed to be square. However, the present invention can also be extended to non-square blocks. In the vertical interpolation as described in equations (9) and (12), an interpolation parameter, (i.e., the weighting factor (N−y)) is related to the size of the block. Similarly, an interpolation parameter, (i.e., the weighting factor (N−x)) is related to the size of the block. For non-square blocks (e.g. width N×height M), "N" is replaced by "M" when the related size is for the y coordinate, and ($\log_2 N+1$) in equations (6) to (14) is replaced by ($\log_2 N+\log_2 M$), where M is the height of the prediction block and N is the width of the prediction block.

Signalling Intra Prediction Fusion

The proposed method can be applied to Intra prediction to add additional Intra perdition modes. In one embedment, one additional flag (e.g., a syntax element) intra_fusion_flag is signalled. At the decoder side, the decoder first parses the bitstream to determine the mode among Planar, DC, and angular prediction modes. Then the intra_fusion_flag is parsed to determine whether it is a regular angular prediction mode or Intra prediction fusion mode. If it is an Intra prediction fusion mode, then the proposed method is applied to obtain the prediction block.

In the case of angular-planar prediction mode, one additional indicator (e.g., a syntax element) angular_planar_flag can be signalled. At the decoder side, the decoder first parses the bitstream to determine the mode among Planar, DC, and angular-prediction modes. Then the angular_planar_flag is parsed to determine whether it is a regular angular prediction mode or an angular-planar prediction mode. If it is the angular-planar prediction mode, then the proposed method is applied to obtain the prediction block.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 6:
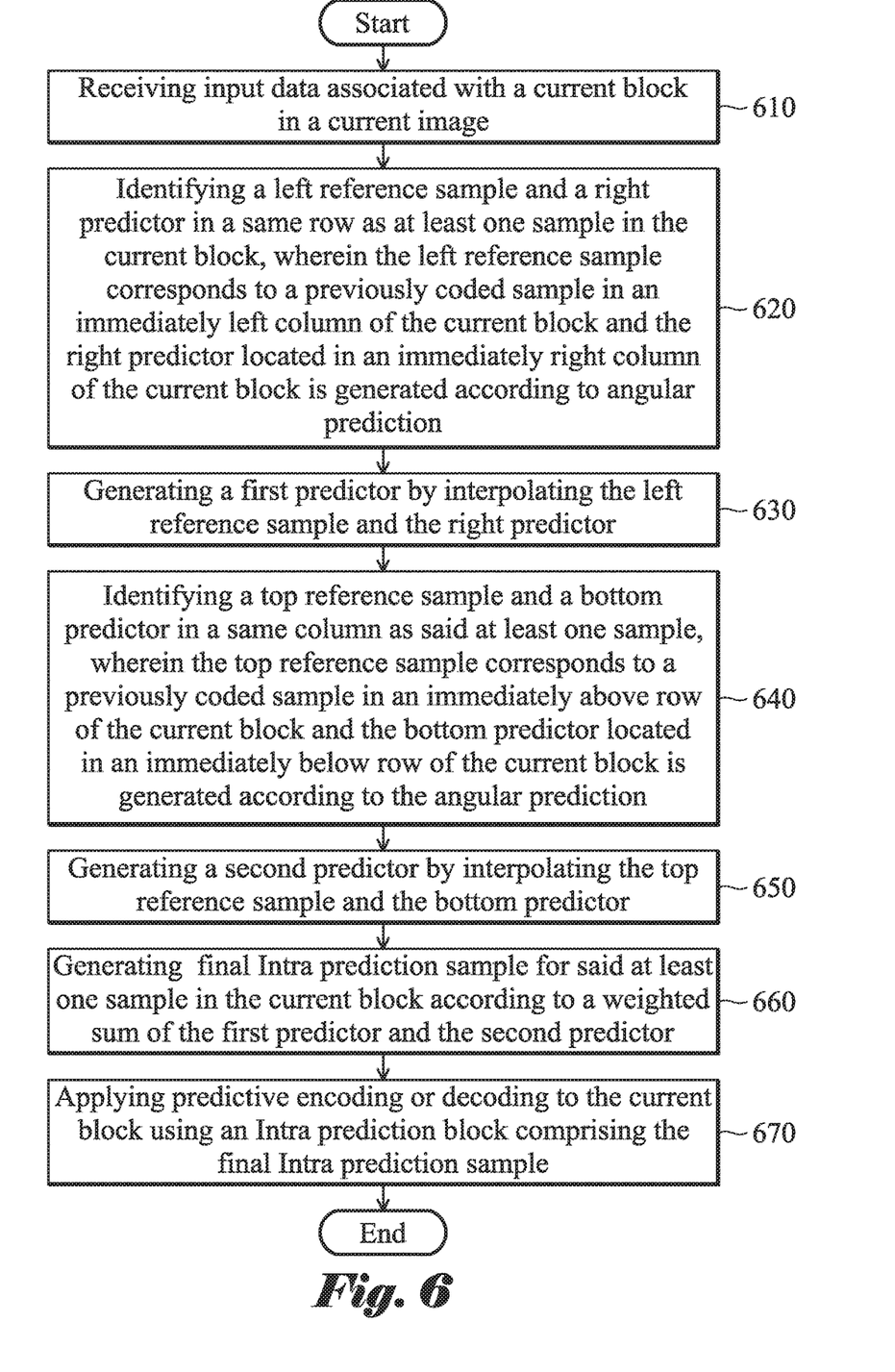
FIG. 6 illustrates a flowchart of an exemplary coding system with angular-planar Intra prediction according to an embodiment of the present invention.

FIG. 6 illustrates a flowchart of an exemplary coding system with angular-planar Intra prediction according to an embodiment of the present invention. According to this method, input data associated with a current block in a current image is received in step 610. A left reference sample and a right predictor in a same row as at least one sample is identified in step 620, wherein the left reference sample corresponds to a previously coded sample in an immediately left column of the current block and the right predictor located in an immediately right column of the current block is generated according to angular prediction. A first predictor is generated by interpolating the left reference sample and the right predictor in step 630. A top reference sample and a bottom predictor in a same column as said at least one sample is identified in step 640, wherein the top reference sample corresponds to a previously coded sample in an immediately above row of the current block and the bottom predictor located in an immediately below row of the current block is generated according to the angular prediction. A second predictor is generated by interpolating the top reference sample and the bottom predictor in step 650. A final Intra prediction sample is generated for said at least one sample in the current block according to a weighted sum of the first predictor and the second predictor in step 660. Predictive encoding or decoding is then applied to the current block using an Intra prediction block comprising the final Intra prediction sample in step 670.

Figure 7:
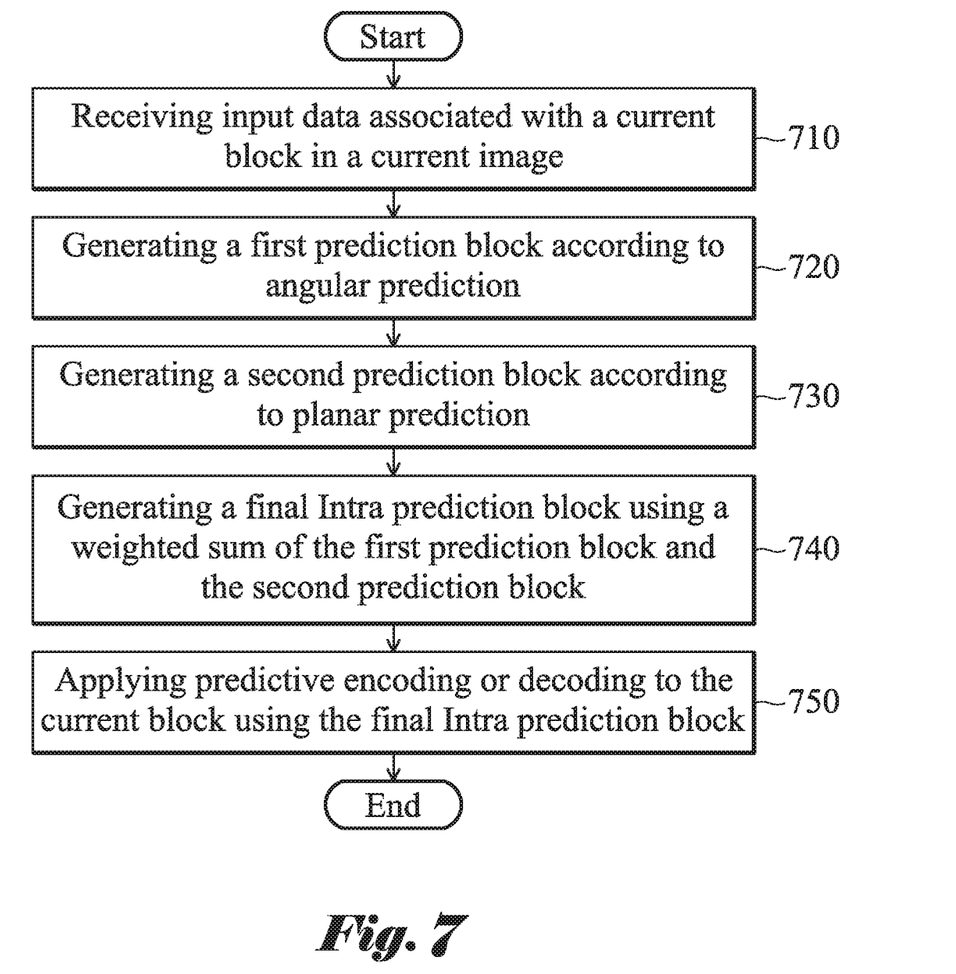
FIG. 7 illustrates a flowchart of an exemplary coding system with Intra prediction fusion to combine angular prediction and planar prediction according to an embodiment of the present invention.

FIG. 7 illustrates a flowchart of an exemplary coding system with Intra prediction fusion to combine angular prediction and planar prediction according to an embodiment of the present invention. According to this method, input data associated with a current block in a current image is received in step 710. A first prediction block is generated according to angular prediction in step 720. A second prediction block is generated according to planar prediction in step 730. A final Intra prediction block is generated using a weighted sum of the first prediction block and the second prediction block in step 740. Predictive encoding or decoding is then applied to the current block using the final Intra prediction block in step 750.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding or decoding used by a video encoding system or a video decoding system respectively, the method comprising:
receiving input data associated with a current block in a current image;
for at least one sample in the current block:
identifying a left reference sample and a right predictor in a same row as said at least one sample, wherein the left reference sample corresponds to a previously coded sample in an immediately left column of the current block and the right predictor located in an immediately right column of the current block is generated according to angular prediction;

generating a first predictor by interpolating the left reference sample and the right predictor;
identifying a top reference sample and a bottom predictor in a same column as said at least one sample, wherein the top reference sample corresponds to a previously coded sample in an immediately above row of the current block and the bottom predictor located in an immediately below row of the current block is generated according to the angular prediction;
generating a second predictor by interpolating the top reference sample and the bottom predictor; and
generating a final Intra prediction sample for said at least one sample in the current block according to the first predictor and the second predictor; and
applying predictive encoding or decoding to the current block using an Intra prediction block comprising the final Intra prediction sample,
wherein an interpolation process of the first predictor uses a first parameter depending on width of the current block; interpolation process of the second predictor uses a second parameter depending on height of the current block; and the final Intra prediction sample is generated using third parameters depending on both height and width of the current block for division-less implementation of the final Intra prediction sample,
wherein a bottom-right corner predictor located at an intersection of the immediately right column of the current block and the immediately below row of the current block is generated from one or more reference samples in an angular direction associated with the angular prediction, wherein the right predictor is generated by interpolating the bottom-right corner predictor and a top-right reference sample located at an intersection of the immediately right column of the current block and the immediately above row of the current block, and the bottom predictor is generated by interpolating the bottom-right corner predictor and a bottom-left reference sample located at an intersection of the immediately left column of the current block and the immediately below row of the current block.

2. The method of claim 1, wherein a top-right predictor located at an intersection of the immediately right column of the current block and the immediately above row of the current block is generated from one or more first reference samples in an angular direction associated with the angular prediction and a bottom-left predictor located at an intersection of the immediately left column of the current block and the immediately below row of the current block is generated from one or more second reference samples in the angular direction associated with the angular prediction, and wherein the right predictor is the same as the top-right predictor and the bottom predictor is the same as the bottom-left predictor.

3. The method of claim 1, wherein the right predictor is generated from one or more first reference samples in an angular direction associated with the angular prediction and the bottom predictor is generated from one or more second reference samples in the angular direction associated with the angular prediction.

4. The method of claim 1, wherein generating the final intra prediction sample according to the first predictor and the second predictor comprises generating the final intra prediction sample according to a weighted sum of the first predictor and the second predictor, the weighted sum is derived using different weighting factors for the first predictor and the second predictor.

5. The method of claim 1, wherein the weighted sum of the first predictor and the second predictor is derived using a same weighting factor corresponding to 0.5 for the first predictor and the second predictor.

6. The method of claim 5, wherein the final Intra prediction sample is calculated by right-shifting a sum of the first predictor and the second predictor by 1 bit.

7. The method of claim 1, further comprising signaling a syntax element to indicate whether the Intra prediction block comprises the final Intra prediction sample at an encoder side.

8. The method of claim 1, further comprising parsing a syntax element indicating whether the Intra prediction block comprises the final Intra prediction sample at a decoder side.

9. An apparatus for video encoding or decoding used by a video encoding system or video decoding system respectively, the apparatus comprising one or more electronic circuits or processors arranged to:
receive input data associated with a current block in a current image;
for at least one sample in the current block:
identify a left reference sample and a right predictor in a same row as said at least one sample, wherein the left reference sample corresponds to a previously coded sample in an immediately left column of the current block and the right predictor located in an immediately right column of the current block is generated according to angular prediction;
generate a first predictor by interpolating the left reference sample and the right predictor;
identify a top reference sample and a bottom predictor in a same column as said at least one sample, wherein the top reference sample corresponds to a previously coded sample in an immediately above row of the current block and the bottom predictor located in an immediately below row of the current block is generated according to the angular prediction;
generate a second predictor by interpolating the top reference sample and the bottom predictor;
generate a final Intra prediction sample for said at least one sample in the current block according to the first predictor and the second predictor; and
apply predictive encoding or decoding to the current block using an Intra prediction block comprising the final Intra prediction sample,
wherein an interpolation process of the first predictor uses a first parameter depending on width of the current block; interpolation process of the second predictor uses a second parameter depending on height of the current block; and the final Intra prediction sample is generated using third parameters depending on both height and width of the current block for division-less implementation of the final Intra prediction sample,
wherein a bottom-right corner predictor located at an intersection of the immediately right column of the current block and the immediately below row of the current block is generated from one or more reference samples in an angular direction associated with the angular prediction, wherein the right predictor is generated by interpolating the bottom-right corner predictor and a top-right reference sample located at an intersection of the immediately right column of the current block and the immediately above row of the current block, and the bottom predictor is generated by interpolating the bottom-right corner predictor and a bottom-left reference sample located at an intersection of the immediately left column of the current block and the immediately below row of the current block.

10. An apparatus for video encoding or decoding used by a video encoding system or video decoding system respectively, the apparatus comprising one or more electronic circuits or processors arranged to:
receive input data associated with a current block in a current image;
generate a first prediction block according to angular prediction;
generate a second prediction block according to planar prediction;
generate a final Intra prediction block according to the first prediction block and the second prediction block; and
apply predictive encoding or decoding to the current block using the final Intra prediction block;
wherein horizontal interpolation process of the planar prediction uses a first parameter depending on width of the current block; vertical interpolation process of the planar prediction uses a second parameter depending on height of the current block; and the final Intra prediction block is generated using third parameters depending on both height and width of the current block for division-less implementation of the planar prediction,
wherein a bottom-right corner predictor located at an intersection of an immediately right column of the current block and the immediately below row of the current block is generated from one or more reference samples in an angular direction associated with the angular prediction, wherein the right predictor is generated by interpolating the bottom-right corner predictor and a top-right reference sample located at an intersection of the immediately right column of the current block and the immediately above row of the current block, and the bottom predictor is generated by interpolating the bottom-right corner predictor and a bottom-left reference sample located at an intersection of an immediately left column of the current block and the immediately below row of the current block.

* * * * *